US011588426B2

(12) United States Patent  
Roemmelmayer et al.

(10) Patent No.: US 11,588,426 B2  
(45) Date of Patent: Feb. 21, 2023

(54) ROTOR ANGLE ERROR COMPENSATION FOR MOTORS

(71) Applicant: Infineon Technologies AG, Neubiberg (DE)

(72) Inventors: Christopher Roemmelmayer, Munich (DE); Radovan Vuletic, Munich (DE)

(73) Assignee: Infineon Technologies AG, Neubiberg (DE)

( * ) Notice: Subject to any disclaimer, the term of this patent is extended or adjusted under 35 U.S.C. 154(b) by 387 days.

(21) Appl. No.: 16/746,077

(22) Filed: Jan. 17, 2020

(65) Prior Publication Data

US 2021/0226567 A1  Jul. 22, 2021

(51) Int. Cl.
  *H02P 21/00* (2016.01)
  *H02P 21/10* (2016.01)
  *H02P 21/18* (2016.01)

(52) U.S. Cl.
  CPC .......... *H02P 21/10* (2013.01); *H02P 21/0014* (2013.01); *H02P 21/18* (2016.02)

(58) Field of Classification Search
  CPC ...... H02P 21/10; H02P 21/0014; H02P 21/18; H02P 21/14; H02P 25/026
  See application file for complete search history.

(56) References Cited

U.S. PATENT DOCUMENTS 6,629,089 B1 * 9/2003 Supino ................... G11B 5/556
    706/15
8,080,964 B2 * 12/2011 Hudson ............... H02P 23/0077
    700/48

(Continued)

FOREIGN PATENT DOCUMENTS

CN  108448979 A  *  8/2018  .......... H02P 21/0014
CN  106788028 B  * 12/2018  .......... H02P 21/0014

(Continued)

OTHER PUBLICATIONS

Yadira Quiñonez, Autonomous Robot Navigation Based on Pattern Recognition Techniques and Artificial Neural Networks, Jun. 2015, DOI: 10.1007/978-3-319-18833-1_34 Conference: International Work-Conference on the Interplay Between Natural and Artificial Computation (Year: 2015).*

(Continued)

*Primary Examiner* — Cortez M Cook

(74) *Attorney, Agent, or Firm* — Shumaker & Sieffert, P.A.

(57) ABSTRACT

An apparatus for driving a motor includes motor circuitry and neural network circuitry. The motor circuitry is configured to generate, based on an error compensated rotor angle and current at a plurality of phases of the motor, a d-axis instant current value and generate a d-axis instant voltage value based on the d-axis instant current value. The motor circuitry is further configured to generate voltage at the plurality of phases based on the d-axis instant voltage value. The neural network circuitry is configured to generate a rotor angle offset based on an instant rotor speed at the motor. The neural network circuitry has been trained to generate the rotor angle offset to minimize the d-axis instant voltage value for each of a plurality of rotor speeds at the motor. The error compensated rotor angle is based on the rotor angle offset.

19 Claims, 10 Drawing Sheets

(56) References Cited

U.S. PATENT DOCUMENTS

| | | | |
|---|---|---|---|
| 2003/0065634 A1* | 4/2003 | Parlos | G06N 3/0454 |
| | | | 706/15 |
| 2003/0102829 A1* | 6/2003 | Walters | H02P 21/34 |
| | | | 318/400.09 |
| 2004/0207367 A1* | 10/2004 | Taniguchi | G01R 31/3648 |
| | | | 320/149 |
| 2008/0315811 A1* | 12/2008 | Hudson | H02P 23/0077 |
| | | | 318/400.34 |
| 2012/0056570 A1* | 3/2012 | Hudson | H02P 23/0077 |
| | | | 318/494 |
| 2014/0145654 A1* | 5/2014 | Zhang | H02P 6/183 |
| | | | 318/400.02 |
| 2015/0311847 A1* | 10/2015 | Kim | H02P 21/141 |
| | | | 318/400.32 |
| 2015/0326162 A1* | 11/2015 | Yoo | H02P 21/141 |
| | | | 318/801 |
| 2018/0131305 A1* | 5/2018 | Wang | H02P 6/04 |
| 2018/0138841 A1* | 5/2018 | Campbell | H02P 6/183 |
| 2021/0075353 A1* | 3/2021 | Tsai | H02P 21/18 |

FOREIGN PATENT DOCUMENTS

| | | | | |
|---|---|---|---|---|
| CN | 113691176 A | * | 11/2021 | H02P 21/00 |
| EP | 1469321 A1 | * | 10/2004 | G01R 31/3624 |

OTHER PUBLICATIONS

Infineon Technolgies, "TLE5x09A16(D) Analog AMR/GMR Angle Sensors," V 2.0, Dec. 2018, accessed from www.infineon.com/sensors, 33 pp.

* cited by examiner

ROTOR ANGLE ERROR COMPENSATION FOR MOTORS

TECHNICAL FIELD

This disclosure relates to electric motors, and more particularly, to techniques and circuits associated with field oriented control (FOC) for electric motors.

BACKGROUND

Operation of electric motors may be performed by a motor circuitry. The motor circuitry controls a rotor rotation of the motor based on a position of the rotor relative to a stator winding of the motor. For example, the motor circuitry may drive current at each at phase of the motor based on the position of the rotor to maximize torque output by the motor.

SUMMARY

The disclosure describes techniques, devices, and systems for improving operation of motor circuitry for driving a motor. Rather than relying on a look-up table or non-linear functions to estimate a rotor angle offset to compensate for deviation of a measured or estimated rotor position of the motor from a true rotor position, neural network circuitry may be trained to generate a rotor angle offset. In this way, motor circuitry may use a rotor angle offset that is more accurate compared to systems relying on a look-up table, a linear function, or a non-linear function.

In one example, the disclosure is directed to an apparatus for driving a motor, the apparatus comprising: motor circuitry configured to: generate, based on an error compensated rotor angle and current at a plurality of phases of the motor, a d-axis instant current value; generate a d-axis instant voltage value based on the d-axis instant current value; and generate voltage at the plurality of phases based on the d-axis instant voltage value; and neural network circuitry configured to generate a rotor angle offset based on an instant rotor speed at the motor, wherein the neural network circuitry has been trained to generate the rotor angle offset to minimize the d-axis instant voltage value for each of a plurality of rotor speeds at the motor and wherein the error compensated rotor angle is based on the rotor angle offset.

In another example, the disclosure is directed to a method comprising: generating, by processing circuitry and based on an error compensated rotor angle and current at a plurality of phases of the motor, a d-axis instant current value; generating, by the processing circuitry, a d-axis instant voltage value based on the d-axis instant current value; generating, by the processing circuitry, voltage at the plurality of phases based on the d-axis instant voltage value; and generating, by neural network circuitry of the processing circuitry, a rotor angle offset based on an instant rotor speed at the motor, wherein the neural network circuitry has been trained to generate the rotor angle offset to minimize the d-axis instant voltage value for each of a plurality of rotor speeds at the motor and wherein the error compensated rotor angle is based on the rotor angle offset.

In one example, the disclosure is directed to an apparatus for driving a motor, the apparatus comprising: motor circuitry configured to: generate, based on an error compensated rotor angle and current at a plurality of phases of the motor, a d-axis instant current value; generate a d-axis instant voltage value based on the d-axis instant current value; and generate voltage at the plurality of phases based on the d-axis instant voltage value; and neural network circuitry configured to: apply training to a plurality of neurons of the neural network circuitry to configure the plurality of neurons to generate a respective rotor angle offset for each of a plurality of rotor speeds that minimize the d-axis instant voltage value; and after applying the training, generate a rotor angle offset based on an instant rotor speed at the motor, wherein the error compensated rotor angle is based on the rotor angle offset.

In another example, the disclosure is directed to an apparatus comprising: means for generating, based on an error compensated rotor angle and current at a plurality of phases of the motor, a d-axis instant current value; means for generating a d-axis instant voltage value based on the d-axis instant current value; means for generating voltage at the plurality of phases based on the d-axis instant voltage value; and means for generating, by neural network circuitry, a rotor angle offset based on an instant rotor speed at the motor, wherein the neural network circuitry has been trained to generate the rotor angle offset to minimize the d-axis instant voltage value for each of a plurality of rotor speeds at the motor and wherein the error compensated rotor angle is based on the rotor angle offset.

The details of one or more examples are set forth in the accompanying drawings and the description below. Other features, objects, and advantages of the disclosure will be apparent from the description and drawings, and from the claims.

Figure 1:
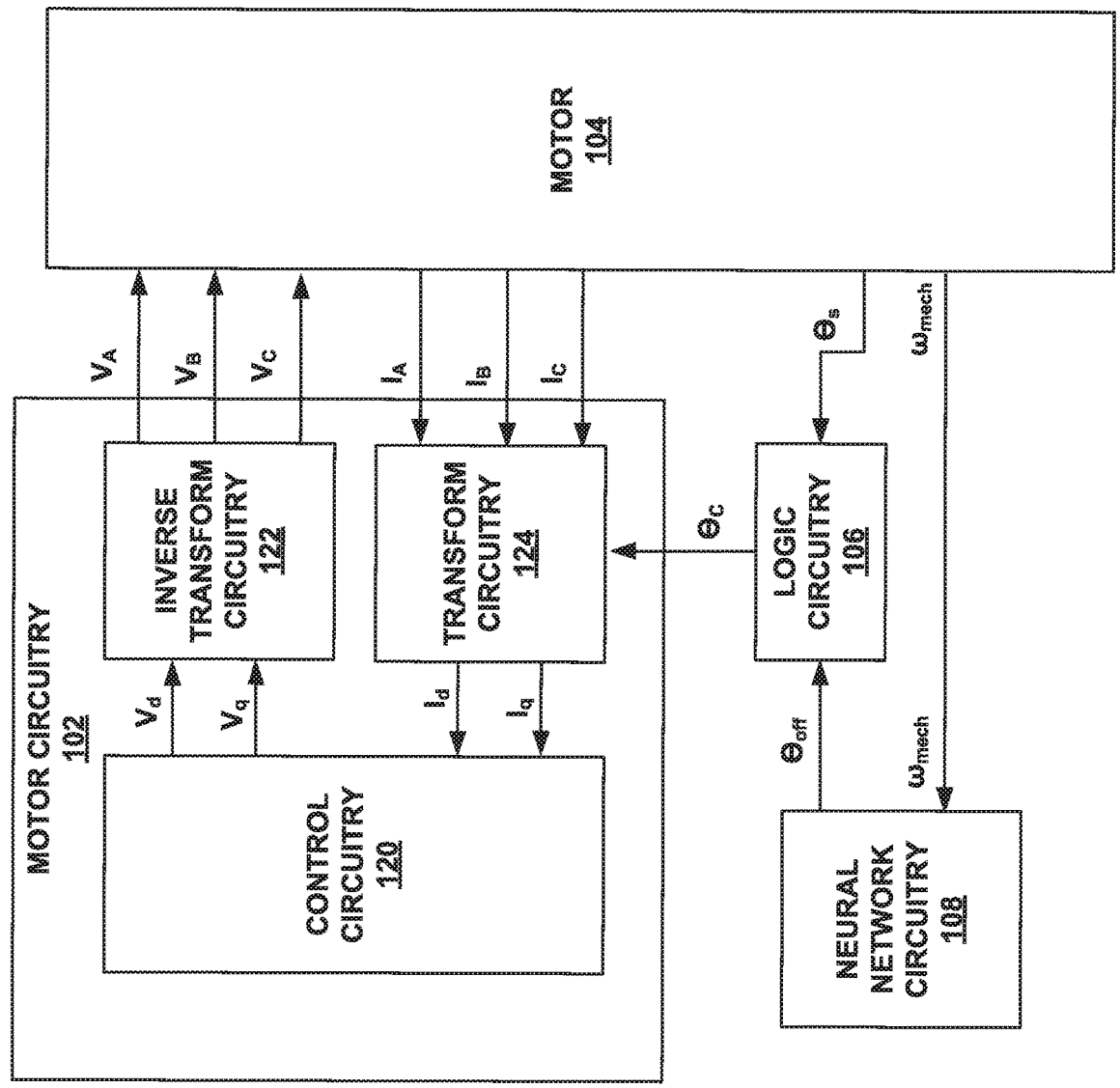
FIG. 1 is a block diagram illustrating an example first system configured for driving a motor using an error compensated rotor angle, in accordance with one or more techniques of this disclosure.

The details of one or more examples are set forth in the accompanying drawings and the description below. Other features, objects, and advantages will be apparent from the description, drawings, and claims.

DETAILED DESCRIPTION

An example field oriented motor control (FOC) system may control a motor, such as, but not limited to, for example, a permanent magnet synchronous motor (PMSM). In this example, motor circuitry may perform a Clarke transformation, perform a Park transformation, and perform space vector modulation to apply voltages to phases of the motor. In this example, the motor circuitry may perform the Park transformation based on a sensed rotor angle value ("$\Theta_S$") measured with rotor position sensor circuitry. Although this example uses a sensed rotor angle value, some examples may additionally, or alternatively, include an estimated rotor angle value that is derived or calculated by rotor position estimation circuitry.

Hardware delays, software delays, and/or inaccuracies may cause the sensed rotor angle value (or estimated rotor angle value), which is fed to the control algorithm, to deviate from the true rotor angle value ("$\Theta_T$"). To help to implement stable and performance control algorithms, motor circuitry may be configured to minimize a difference between the true rotor angle value and the sensed rotor angle value. For instance, motor circuitry may be configured to generate a compensated rotor angle value based on the sensed rotor angle value such that a difference between the true rotor angle value and the compensated rotor angle is zero. In some examples, motor circuitry may be configured to minimize a difference between the true rotor angle value and an estimated rotor angle value. For instance, motor circuitry may be configured to drive a difference between the true rotor angle value and the estimated rotor angle value to zero.

The motor circuitry may benefit from high precision in the compensated rotor angle value determination to calculate a desired d-axis instant voltage, which, for example, may be obtained by a proportional-integral controller from d-axis instant current. In some examples, d-axis instant current may be represented in a first rotating reference frame fixed to a rotor of the motor. In some examples, d-axis instant current may be represented in a first rotating reference frame fixed to a stator of the motor. Similarly, the motor circuitry may benefit from high precision in the compensated rotor angle value determination to calculate a desired q-axis instant voltage, which, for example, may be obtained by a proportional-integral controller from q-axis instant current. In some examples, q-axis instant current may be represented in a second rotating reference frame that is perpendicular to the first rotating reference frame for the d-axis instant current.

Furthermore, for some control algorithms, the motor circuitry may be configured to align the compensated rotor angle value and phase current measurements. In this example, misalignment between phase current and the compensated rotor angle value may cause the motor circuitry to calculate a d-axis instant voltage and/or a q-axis instant voltage that do not correspond to (e.g., match) d-axis instant voltage and/or q-axis instant voltage of the real physical system, which in turn may cause instability. Due at least in part to this insatiability, the motor controller may lose control of the overall motor system.

Some example reasons for the deviation of the sensed rotor angle value and/or the estimated rotor angle value from the true rotor angle value may include, but are not limited to, position sensor delay, transmission delay, expired calculation time, pulse-width modulation (PWM) techniques (e.g., delays from averaging over time), temperature drifts, or other reasons. Position sensor delay may include intrinsic signal delays from a moment of position acquisition to generate a captured value to transmitting the captured value. Transmission delay may include delays from transmitting the captured value to motor circuitry (e.g., a microcontroller). For instance, transmission delay may include delays from one or more low pass filters for signal conditioning. Expired calculation time of FOC may refer to delays in calculating by the motor circuitry. For instance, expired calculation time may include delays in the motor circuitry (e.g., a microcontroller) in performing a Clarke transformation, performing a Park transformation, and/or performing space vector modulation. All effects listed above may exist at every motor speed, but the FOC system may be intrinsically more sensitive on those effects at higher speeds compared to other systems. Therefore, especially at field weakening operation mode, the motor circuitry may compensate the sensed rotor angle value or estimated rotor angle value to help to ensure a true rotor angle value is used to control the motor.

To help to account for a deviation of the sensed rotor angle value from the true rotor angle value, motor circuitry may be configured to calculate a rotor angle offset based on an instant rotor speed at the motor. For example, some systems may use a look-up table (LUT) to generate the rotor angle offset. However, non-linear behavior of the relationship between the rotor angle offset and the instant rotor speed may cause the look-up table to be memory intensive. Moreover, the look-up table may be based on a function that does not accurately match the calculated rotor angle offsets to the true rotor angle offsets.

Some systems may use linear or non-linear functions to help to account for a deviation of the sensed rotor angle value from the true rotor angle value. However, function fitting the linear function and/or non-linear function may be computationally intensive. Additionally, techniques using a look-up table, a linear function, and/or a non-linear function may rely on manual input. For instance, techniques using a look-up table, a linear function, and/or a non-linear function may rely initial compensation values that are input by a human user. As such, techniques using a look-up table and/or techniques using linear or non-linear functions may not adapt a transform curve (e.g., the sensed rotor angle values for different instant rotor speeds) during a lifetime of the motor circuitry and/or motor.

Rather than relying on a look-up table, linear-function, or non-linear function to estimate a rotor angle offset to compensate for deviation of a sensed rotor angle value or an estimated rotor angle value from the true rotor angle value, neural network circuitry may be trained to generate a rotor angle offset. In this way, motor circuitry may use a rotor angle offset that may be more accurate compared to systems relying on a look-up table, linear-function, or non-linear function. Moreover, the motor circuitry may adapt the rotor angle offset when the motor circuitry and/or motor is online (e.g., in service), which may improve stability of the motor circuitry compared to systems using a look-up table, linear-function, or non-linear function to estimate a rotor angle offset. In this way, techniques described herein using neural network circuitry may enable a simplified and automated lifetime adaptive compensation of the angle error.

FIG. 1 is a block diagram illustrating an example first system 100 configured for driving a motor 104 using an error compensated rotor angle, in accordance with one or more techniques of this disclosure. System 100 may include motor circuitry 102, motor 104, logic circuitry 106, and neural network circuitry 108. While FIG. 1 shows system 100 as having separate and distinct components, some components may be combined or further separated. For example, motor circuitry 102, logic circuitry 106, and neural network circuitry 108 may be combined. For instance, motor circuitry 102, logic circuitry 106, and neural network circuitry 108 may be formed into an integrated circuit (IC). In some examples, however, motor circuitry 102 may be a separate and distinct from logic circuitry 106 and/or neural network circuitry 108.

Motor 104 may include a permanent-magnet-synchronous-motor (PMSM). For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet. The permanent magnet may include rare-earth elements, such as Neodymium-Iron-Boron (NdFeB), Samarium-Cobalt (SmCo), or Ferrite elements (e.g., Barium (Ba) or Strontium (Sr)). In some examples, the permanent magnet may include a protective coating such as a layer of Gold (Au), Nickel (Ni), Zinc (Zn), or the like. In some examples, motor 104 may be a DC-excited motor.

Motor circuitry 102 may be configured to generate voltage at phases of motor 104 to drive motor 104. For example, as shown, motor circuitry 102 may be configured to output a first phase voltage ("$V_A$"), a second phase voltage ("$V_B$"), and a third phase voltage ("$V_C$") to drive motor 104. As shown, motor circuitry 102 may include control circuitry 120, transform circuitry 124, and inverse transform circuitry 122. Motor circuitry 102 may include, for example, a microcontroller on a single integrated circuit containing a processor core, memory, inputs, and outputs. For example, motor circuitry 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, motor circuitry 102 may be a combination of one or more analog components and one or more digital components.

Transform circuitry 124 may be configured to generate, based on an error compensated rotor angle output ("$\Theta_C$") by logic circuitry 106 and current at a plurality of phases of motor 104, a d-axis instant current value ("$I_d$"). For instance, transform circuitry 124 may generate (e.g., with a Park transform, a Clarke transform, etc.) the d-axis instant current value based on the error compensated rotor angle output and a first phase current ("$I_A$"), a second phase current ("$I_B$"), and a third phase current ("$I_C$"). The d-axis instant current may be represented in a first rotating reference frame fixed to a rotor or stator of motor 104.

Similarly, transform circuitry 124 may be configured to generate, based on an error compensated rotor angle output by logic circuitry 106 and current at a plurality of phases of motor 104, a q-axis instant current value ("$I_q$"). For instance, transform circuitry 124 may generate (e.g., with a Park transform, a Clarke transform, etc.) the q-axis instant current value based on the error compensated rotor angle output and the first phase current, the second phase current, and the third phase current. The q-axis instant current may be represented in a second rotating reference frame that is perpendicular to the first rotating reference frame for the d-axis instant current.

Control circuitry 120 may be configured to generate a d-axis instant voltage value ("$V_d$") based on the d-axis instant current value. For instance, control circuitry 120 may include a proportional-integral controller configured to generate the d-axis instant voltage value based on the d-axis instant current value. Similarly, control circuitry 120 may be configured to generate a q-axis instant voltage value ("$V_q$") based on the q-axis instant current value. For instance, control circuitry 120 may include a proportional-integral controller configured to generate the q-axis instant voltage value based on the q-axis instant current value.

Inverse transform circuitry 122 may be configured to generate voltage at phases of motor 104. For instance, inverse transform circuitry 122 may generate (e.g., with an inverse Park transform, an inverse Clarke transform, etc.) the first phase voltage, the second phase voltage, and the third phase voltage based on the d-axis instant voltage value. Similarly, inverse transform circuitry 122 may generate (e.g., with an inverse Park transform, an inverse Clarke transform, etc.) the first phase voltage, the second phase voltage, and the third phase voltage based on the q-axis instant voltage value. In some examples, inverse transform circuitry 122 may be configured to generate the first phase voltage, the second phase voltage, and the third phase voltage based on an error compensated rotor angle output by logic circuitry 106.

Neural network circuitry 108 may be configured to generate a rotor angle offset ("$\Theta_{off}$") based on an instant rotor speed ("$\omega_{mech}$") at motor 104. Neural network circuitry 108 may be trained to generate the rotor angle offset to minimize the d-axis instant voltage value for each of a plurality of rotor speeds at motor 104. Logic circuitry 106 may be configured to add the rotor angle offset to the sensed rotor angle value to generate the error compensated rotor angle. Neural network circuitry 108 and/or logic circuitry 106 may include, for example, a microcontroller on a single integrated circuit containing a processor core, memory, inputs, and outputs. For example, Neural network circuitry 108 and/or logic circuitry 106 may include one or more processors, including one or more microprocessors, DSPs, ASICs, FPGAs, or any other equivalent integrated or discrete logic circuitry, as well as any combinations of such components. In some examples, neural network circuitry 108 and/or logic circuitry 106 may be a combination of one or more analog components and one or more digital components.

In accordance with the techniques of the disclosure, motor circuitry 102 may generate, based on an error compensated rotor angle and current at a plurality of phases of the motor, a d-axis instant current value. In this example, motor circuitry 102 may generate a d-axis instant voltage value based on the d-axis instant current value and generate voltage at the plurality of phases based on the d-axis instant voltage value. Neural network circuitry 108 may generate a rotor angle offset based on an instant rotor speed at motor 104. In this example, neural network circuitry 108 has been trained to generate the rotor angle offset to minimize the d-axis instant voltage value for each of a plurality of rotor speeds at motor 104. In this example, the error compensated rotor angle is based on the rotor angle offset. For instance, logic circuitry 106 may add a sensed rotor angle value to the rotor angle offset output by neural network circuitry 108 to generate the error compensated rotor angle. In some instances, logic circuitry 106 may add an estimated rotor angle value to the rotor angle offset output by neural network circuitry 108 to generate the error compensated rotor angle.

Figure 2:
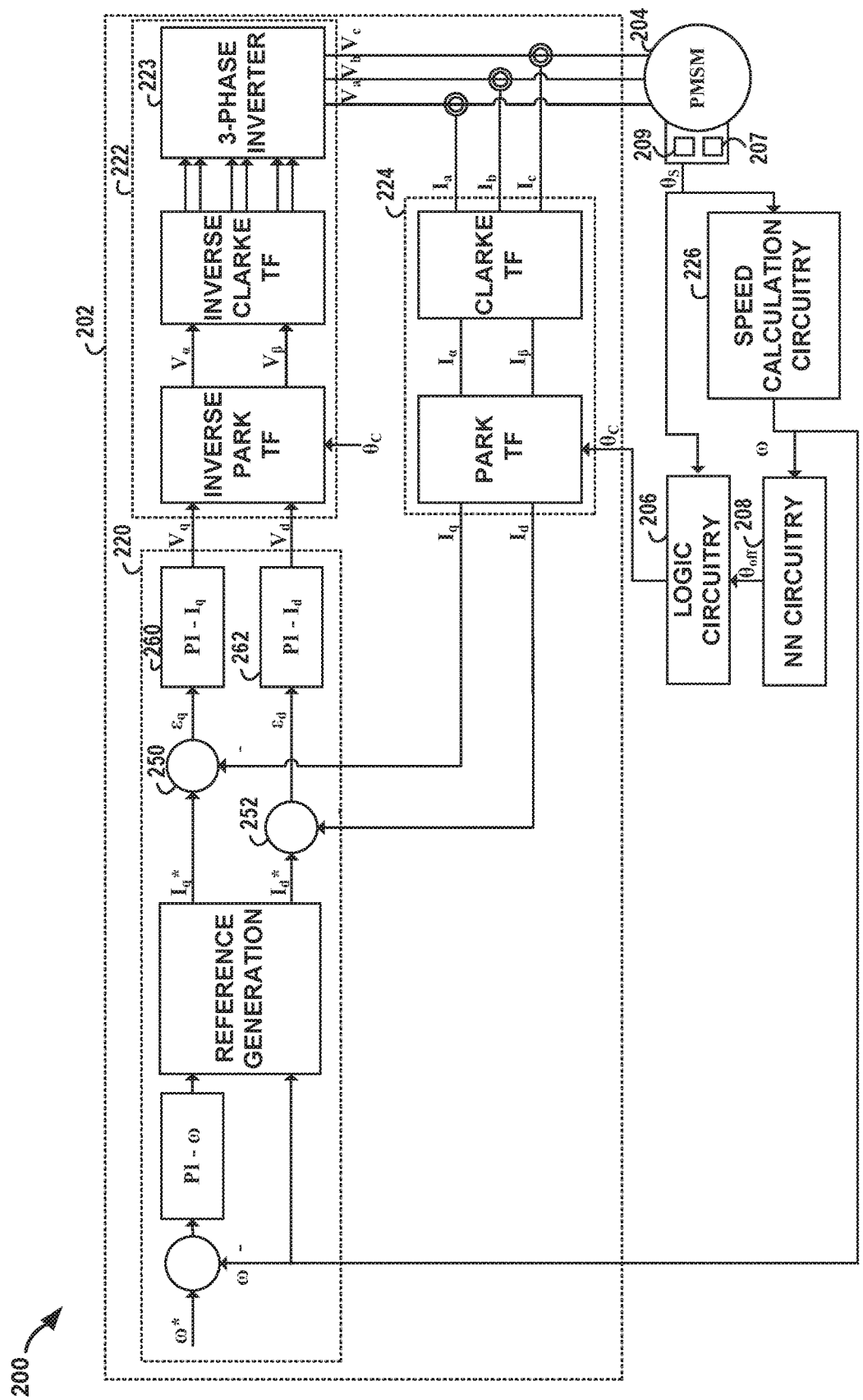
FIG. 2 is a block diagram illustrating an example second system configured for driving a motor using an error compensated rotor angle, in accordance with one or more techniques of this disclosure.

FIG. 2 is a block diagram illustrating an example second system 200 configured for driving a motor 204 using an error compensated rotor angle, in accordance with one or more techniques of this disclosure. Motor circuitry 202, motor 204, logic circuitry 206, and neural network circuitry ("NN CIRCUITRY") 208 may be examples of motor circuitry 102, motor 104, logic circuitry 106, and neural network circuitry 108 of FIG. 1. As shown, the example of FIG. 2 further includes speed calculation circuitry 226.

In the example of FIG. 2, motor 204 is a PMSM motor. However, in other examples, motor 204 may be different. Motor 204 may be configured for various speeds. Motor 204 may include rotor position sensor circuitry 207 configured to detect a sensed rotor angle value ("$\Theta_S$") of a rotor of motor 204. In some examples, rotor position sensor circuitry 207 may include a hardware position sensor (e.g., an encoder type). However, rotor position sensor circuitry 207 may include any type of sensor to acquire a rotor position at motor 204. Additionally, or alternatively, motor 204 may include rotor position estimation circuitry 209 configured to generate an estimated rotor angle value of the rotor. For instance, rotor position estimation circuitry 209 may include one or more positions observers implemented in logic. Such observers of rotor position estimation circuitry 209 may use various signals other than the physical rotor angle to calculate the rotor position at motor 204.

Speed calculation circuitry 226 may be configured to determine an instant rotor speed ("$\omega$") using a sensed rotor angle value output by rotor speed sensor circuitry 207. In some examples, speed calculation circuitry 226 may be configured to determine an instant rotor speed using an estimated rotor angle value output by rotor speed estimation circuitry 209. Speed calculation circuitry 226 may be configured to determine an instant rotor speed using both a sensed rotor angle value output by rotor speed sensor circuitry 207 and an estimated rotor angle value output by rotor speed estimation circuitry 209.

Logic circuitry 206 may be configured to determine the error compensated rotor angle based on the rotor angle offset. For example, logic circuitry 206 may be configured to add a rotor angle offset generated by neural network circuitry 208 to the sensed rotor angle value generated by rotor speed sensor circuitry 207 to generate an error compensated rotor angle. In some examples, logic circuitry 206 may be configured to add the rotor angle offset generated by neural network circuitry 208 to the estimated rotor angle value generated by rotor position estimation circuitry 209 to generate the error compensated rotor angle.

Motor circuitry 202 may include transform circuitry 224, control circuitry 220, and inverse transform circuitry 222. Transform circuitry 224 may be configured to apply a Clarke transform on current at phases (e.g., $I_a$, $I_b$, and $I_c$) to generate an alpha current value ("$I_\alpha$") and a beta current value ("$I_\beta$"). Transform circuitry 224 may be configured to apply, based on the error compensated rotor angle ("$\Theta_C$"), a Park transform on the alpha current value and the beta current value to generate the d-axis instant current value ("$I_d$"). In some examples, the d-axis instant current value may be represented in a first rotating reference frame fixed to a rotor of the motor. In some examples, d-axis instant current may be represented in a first rotating reference frame fixed to a stator of the motor. Similarly, transform circuitry 224 may be configured to apply, based on the error compensated rotor angle ("$\Theta_C$"), a Park transform on the alpha current value and the beta current value to generate the q-axis instant current value ("$I_q$") and the q-axis instant current value ("$I_q$"). In some examples, the q-axis instant current may be represented in a second rotating reference frame that is perpendicular to the first rotating reference frame for the d-axis instant current.

Control circuitry 220 may be configured to generate a d-axis current error value ("$\varepsilon_d$") based on a difference between the d-axis instant current value and a d-axis reference value ("$I_{d*}$"). For instance, summer 252 may be configured to subtract the d-axis instant current value from the d-axis reference value. In some examples, the d-axis reference value corresponds (e.g., equals, is about equal to, etc.) to zero. Control circuitry 220 may be configured to apply a proportional-integral controller 262 configured to generate the d-axis instant voltage value ("$V_d$") to minimize the d-axis instant current value error value.

Control circuitry 220 may be configured to generate a q-axis current error value ("$\varepsilon_q$") based on a difference between the q-axis instant current value and a q-axis reference value ("$I_{q*}$"). For instance, summer 250 may be configured to subtract the q-axis instant current value from the q-axis reference value. In some examples, the q-axis reference value corresponds (e.g., equals, is about equal to, etc.) to zero. Control circuitry 220 may be configured to apply a proportional-integral controller 260 configured to generate the q-axis instant voltage value ("$V_q$") to minimize the d-axis instant current value error value.

Inverse transform circuitry 222 may be configured to apply, based on the error compensated rotor angle, an inverse Park transform on the d-axis instant voltage value and the q-axis instant voltage to generate an alpha voltage value ("$V_\alpha$") and a beta voltage value ("$V_\beta$"). In this example, inverse transform circuitry 222 may apply an inverse Clarke transform on the alpha current value and the beta current value to generate the voltage at the phases of motor 204 (e.g., $V_a$, $V_b$, and $V_c$). In some examples, the voltage at phases of motor 204 may be based on the d-axis instant voltage value and/or the q-axis instant voltage value. For instance, a 3-phase inverter 223 of inverse transform circuitry 222 may be configured to generate the voltage at phases of motor 204 based on calculated currents output from the inverse Clarke transform. Although the example of FIG. 2 shows 3-phase inverter 223 as part of inverse transform circuitry 222, in some examples, 3-phase inverter 223 may be a separate component from inverse transform circuitry 222.

Neural network circuitry 208 may be configured to generate a rotor angle offset based on an instant rotor speed at motor 204. For instance, neural network circuitry 208 may be configured to generate a rotor angle offset based on an instant rotor speed output by speed calculation circuitry 226. Neural network circuitry 208 may formed using any type of networks with more than a single hidden layer and an infinite amount of neurons. In some examples, neural network circuitry 208 may use architectures such as, for example, but not limited to, convolutional networks, recurrent networks, networks based on reinforcement learning, or another architecture. Neural network circuitry 208 may be configured for various rotor angle offset ranges.

Neural network circuitry 208 may have been trained to generate the rotor angle offset to minimize the d-axis instant voltage value for each of a plurality of rotor speeds at the motor. For example, neural network circuitry 208 may be configured to train, for each rotor speed of the plurality of rotor speeds, the plurality of neurons of the neural network circuitry to output the respective rotor angle offset that minimizes the d-axis instant voltage value (see FIG. 5).

Figure 3:
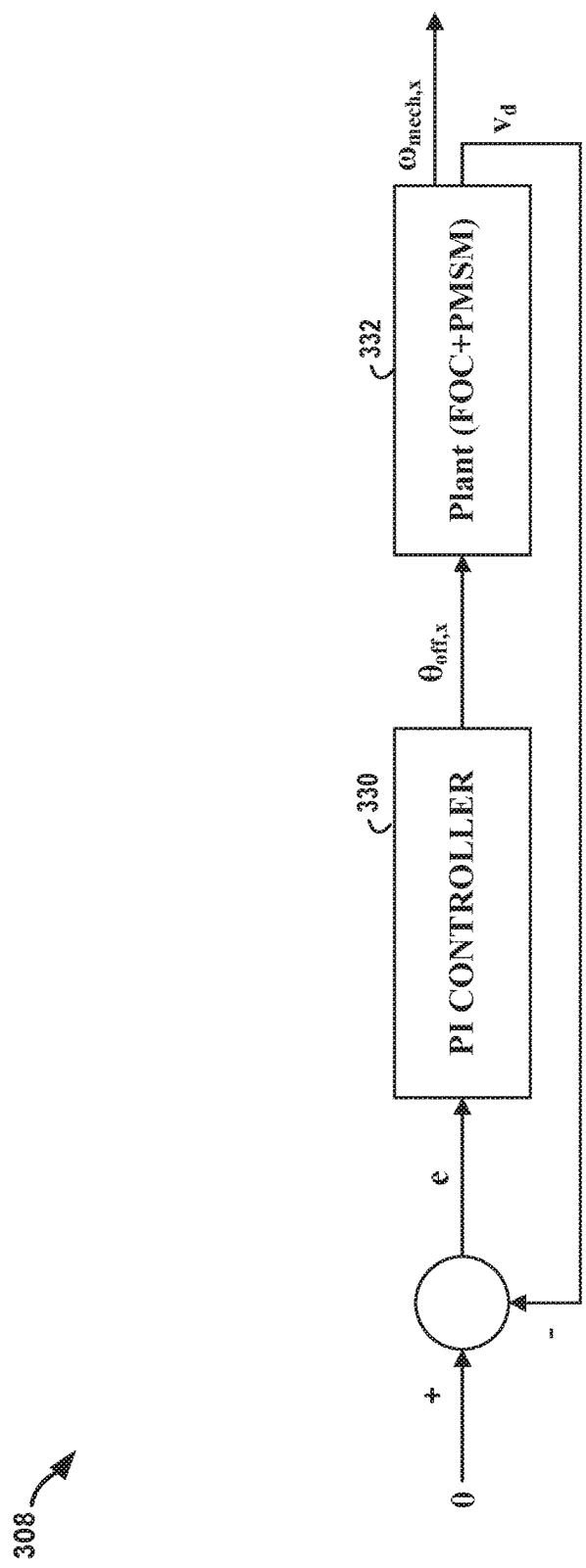
FIG. 3 is a block diagram illustrating an example system configured for performing a first step for training neural network circuitry to generate a rotor angle offset, in accordance with one or more techniques of this disclosure.
Figure 4:
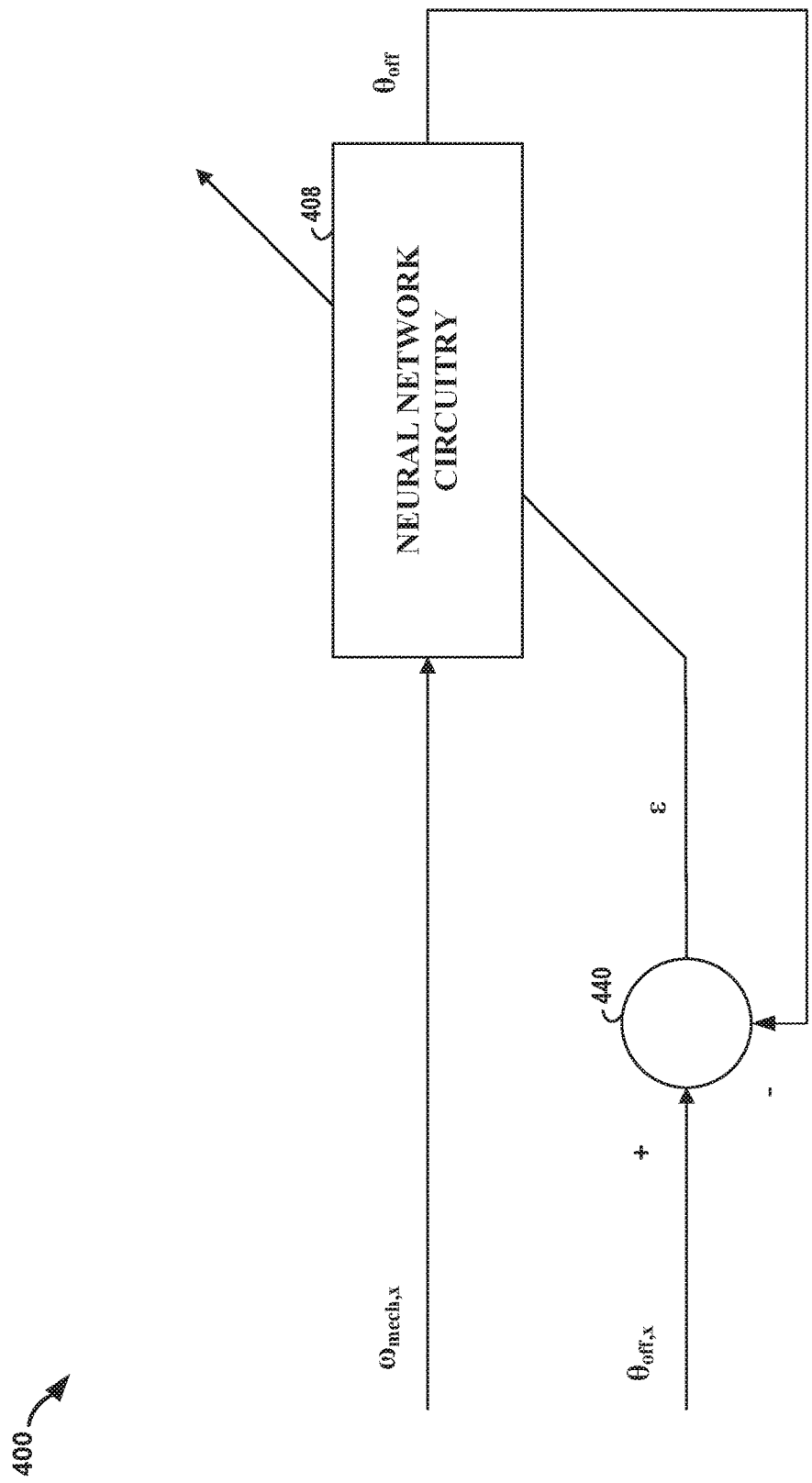
FIG. 4 is a block diagram illustrating an example system configured for performing a second step for the training neural network circuitry of FIG. 3, in accordance with one or more techniques of this disclosure.

Neural network circuitry 208 may be configured to apply training to a plurality of neurons of neural network circuitry 208 to configure the plurality of neurons to generate a respective rotor angle offset for each of a plurality of rotor speeds that minimize the d-axis instant voltage value (See FIGS. 3, 4). In this example, after applying the training, neural network circuitry 208 may generate the rotor angle offset based on the instant rotor speed at the motor.

Neural network circuitry 208 may be configured to generate a rotor speed table. In this example, each entry in the rotor speed table includes a respective rotor speed value of a plurality of rotor speeds and a corresponding true rotor angle offset. In this example, neural network circuitry 208 may be configured to train the plurality of neurons of neural network circuitry 208 using the rotor speed table. For instance, neural network circuitry 208 may be configured to train, for each respective rotor speed value of the plurality of rotor speeds, the plurality of neurons of neural network circuitry 208 to minimize a difference between the respective rotor angle offset output by neural network circuitry 208 and the corresponding true rotor angle offset.

Not only the rotor speed can be used as an input, but neural network circuitry 208 may be configured to use any other signal influencing the rotor angle offset. For example, neural network circuitry 208 may be configured to use temperature deviations to generate rotor angle offset. In some examples, neural network circuitry 208 may be configured to train a plurality of neurons of neural network circuitry 208 to configure the plurality of neurons to generate the rotor angle offset to minimize the d-axis instant voltage value for a plurality of temperature values.

Not only can the neural network circuitry 208 be trained during an initial setup, but neural network circuitry 208 may be configured to train after the initial setup (e.g., while in service). For example, neural network circuitry 208 may be configured to train, after the initial setup and for each rotor speed of the plurality of rotor speeds, a plurality of neurons of the neural network circuitry to output the rotor angle offset that minimizes the d-axis instant voltage value (See FIG. 5).

Neural network circuitry 208 may be configured to train, after the initial setup, a plurality of neurons of neural network circuitry 208 to generate the rotor angle offset to minimize the d-axis instant voltage value. In this example, neural network circuitry 208 may be configured to generate a rotor speed table, each entry in the rotor speed table comprising a respective rotor speed value of the plurality of rotor speeds and a corresponding true rotor angle offset. Neural network circuitry 208 may be configured to train the plurality of neurons of the neural network circuitry using the rotor speed table. More specifically, for example, neural network circuitry 208 may be configured to train, for each respective rotor speed value of the plurality of rotor speeds, the plurality of neurons of the neural network circuitry to minimize a difference between the rotor angle offset output by neural network circuitry 208 and the corresponding true rotor angle offset (See FIGS. 3, 4).

Neural network circuitry 208 may be configured to train, after the initial setup, a plurality of neurons of the neural network circuitry to generate the rotor angle offset to minimize the d-axis instant voltage value. Neural network circuitry 208 may be configured to generate a temperature table. In this example, each entry in the temperature table includes a respective temperature value of a plurality of temperature values and a corresponding true rotor angle offset. Neural network circuitry 208 may be configured to train the plurality of neurons of the neural network circuitry using the temperature table.

In accordance with the techniques of the disclosure, transform circuitry 224 may generate, based on an error compensated rotor angle and current at a plurality of phases of the motor, a d-axis instant current value. In this example, control circuitry 220 may generate a d-axis instant voltage value based on the d-axis instant current value and generate voltage at the plurality of phases based on the d-axis instant voltage value. Neural network circuitry 208 may generate a rotor angle offset based on an instant rotor speed at motor 204. In this example, neural network circuitry 208 has been trained to generate the rotor angle offset to minimize the d-axis instant voltage value for each of a plurality of rotor speeds at motor 204. In this example, the error compensated rotor angle is based on the rotor angle offset. For instance, logic circuitry 206 may add a sensed rotor angle value to the rotor angle offset output by neural network circuitry 208 to generate the error compensated rotor angle. In some instances, logic circuitry 206 may add an estimated rotor angle value to the rotor angle offset output by neural network circuitry 208 to generate the error compensated rotor angle.

In this way, motor circuitry 202 may use a rotor angle offset that may be more accurate compared to systems relying on a look-up table, linear-function, or non-linear function. Moreover, motor circuitry 202 may adapt the rotor angle offset when the motor circuitry and/or motor is online (e.g., in service), which may improve stability of motor circuitry 202 compared to systems using a look-up table, linear-function, or non-linear function to estimate a rotor angle offset.

FIG. 3 is a block diagram illustrating an example system configured for performing a first step for training neural network circuitry 308 to generate a rotor angle offset, in accordance with one or more techniques of this disclosure. Although FIG. 3 is discussed with reference to system 100 of FIG. 1 and system 200 of FIG. 2, techniques of FIG. 3 may be used with other systems. Neural network circuitry 308 may be an example of neural network circuitry 108 of FIG. 1 and neural network circuitry 208 of FIG. 2. Plant 332 may be an example of motor circuitry 102 and motor 104.

Neural network circuitry 308 may be configured to map the function $f(\omega_{mech}) = \Theta_{off}$ to calculate $\Theta_T = \Theta_{off} + \Theta_S$ for the transformation performed by neural network circuitry 308. For example, neural network circuitry 308 may implement a learning procedure in two steps. In the first step, neural network circuitry 308 may record the transfer characteristic $\Theta_{off,x} = f(\omega_{mech,x})$ in a form of a rotor speed table collecting a respective rotor speed value ("$\omega_{mech,x}$") and corresponding true rotor angle offset ("$\Theta_{off,x}$") as follows.

Neural network circuitry 308 may be configured to generate a rotor speed table, each entry in the rotor speed table comprising a respective rotor speed value of the plurality of rotor speeds and a corresponding true rotor angle offset. For example, proportional-integral controller 330 ("PI controller") may be configured to generate the true rotor angle offsets ($\Theta_{off,x}$). For instance, neural network circuitry 308 may be configured to drive plant 332 to maintain a particular rotor speed value. In this instance, proportional-integral controller 330 may be configured to generate the true rotor angle offset that drives a d-axis instant voltage value ("$V_d$") output by plant 332 to zero while plant 332 is maintained at a particular rotor speed value of the rotor speed table. In this way, neural network 308 may generate the true rotor angle offset for each rotor speed value of the rotor speed table.

While the example of FIG. 3 uses PI controller 330 to generate the true rotor angle offsets, in other examples, other controllers may be used to generate the true rotor angle offsets. For example, an integral controller without the proportional component may be used to generate the true rotor angle offsets. In some examples, a manual adaption via "trial and error" may be used to generate the true rotor angle offsets.

FIG. 4 is a block diagram illustrating an example system 400 configured for performing a second step for training the neural network circuitry of FIG. 3, in accordance with one or more techniques of this disclosure. Although FIG. 4 is discussed with reference to system 100 of FIG. 1 and system 200 of FIG. 2, techniques of FIG. 4 may be used with other systems. Neural network circuitry 408 may be an example of neural network circuitry 108 of FIG. 1 and neural network circuitry 208 of FIG. 2. As shown, summer 440 may be separated from neural network circuitry 408. In some examples, summer 440 may be included in neural network circuitry 408. Summer 440 may subtract rotor angle offset ("$\theta_{off}$") output by neural network circuitry 408 from the corresponding true rotor angle offset ("$\theta_{off_x}$") of the rotor speed table generated in the example of FIG. 3 to generate a difference ("$\varepsilon$").

In a second step of the learning procedure of FIG. 3, neural network circuitry 408 may be configured to train a plurality of neurons of neural network circuitry 408 to generate the rotor angle offset to minimize the d-axis instant voltage value. For example, neural network circuitry 408 may be configured to train the plurality of neurons of neural network circuitry 408 using the rotor speed table generated in the example of FIG. 3. More specifically, for example, neural network circuitry 408 may be configured to train, for each respective rotor speed value ("$\omega_{mech_x}$") of the plurality of rotor speeds of the rotor speed table, the plurality of neurons of the neural network circuitry to minimize a difference between the rotor angle offset output by neural network circuitry 408 and the corresponding true rotor angle offset of the rotor speed table.

Figure 5:
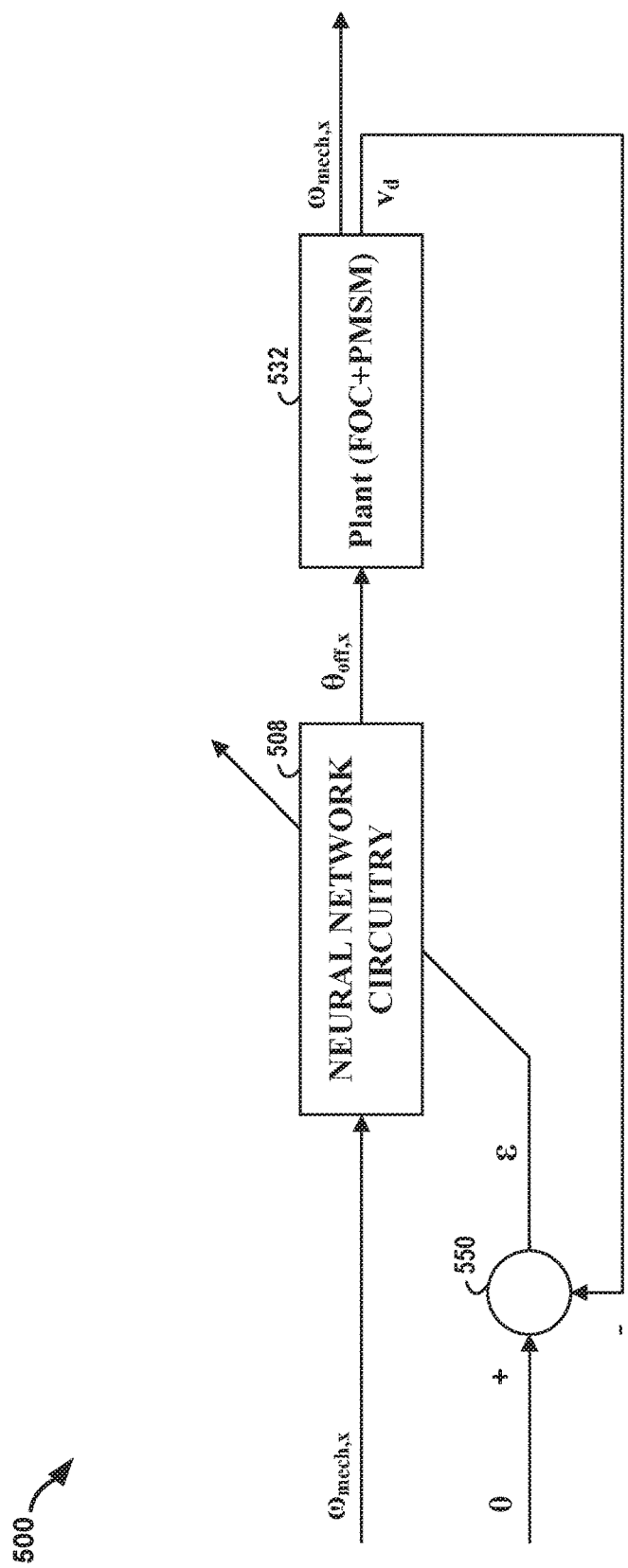
FIG. 5 is a block diagram illustrating an example system configured for training neural network circuitry to generate a rotor angle offset, in accordance with one or more techniques of this disclosure.

FIG. 5 is a block diagram illustrating an example system 500 configured for training neural network circuitry 508 to generate a rotor angle offset, in accordance with one or more techniques of this disclosure. Although FIG. 5 is discussed with reference to system 100 of FIG. 1 and system 200 of FIG. 2, techniques of FIG. 5 may be used with other systems. Neural network circuitry 508 may be an example of neural network circuitry 108 of FIG. 1 and neural network circuitry 208 of FIG. 2. Plant 532 may be an example of motor circuitry 102 and motor 104. As shown, summer 540 may be separated from neural network circuitry 508. In some examples, summer 540 may be included in neural network circuitry 508. Summer 540 may subtract a d-axis instant voltage value ("$V_d$") output by plant 532 from a reference (e.g., 0) to generate an error value ("$\varepsilon$").

In the example of FIG. 5, processes described in FIGS. 3 and 4 are merged together. For example, system 500 may generate a transfer curve for the transfer characteristic $\Theta_{off_x} = f(\omega_{mech_x})$. In this example, system 500 may train a plurality of neurons of neural network circuitry 508 to generate the rotor angle offset to minimize a d-axis instant voltage value output by plant 532. In this way, system 500 may combine the generating of the transfer curve and the training in one closed loop (e.g., instead of having two closed loops). As such, the process of FIG. 5 may have a smaller code size and/or smaller memory usage compared to the process of FIGS. 3 and 4. For example, neural network circuitry 508 may be configured to train, and for each rotor speed of the plurality of rotor speeds, a plurality of neurons of the neural network circuitry to output the rotor angle offset that minimizes the d-axis instant voltage value.

Figure 6:
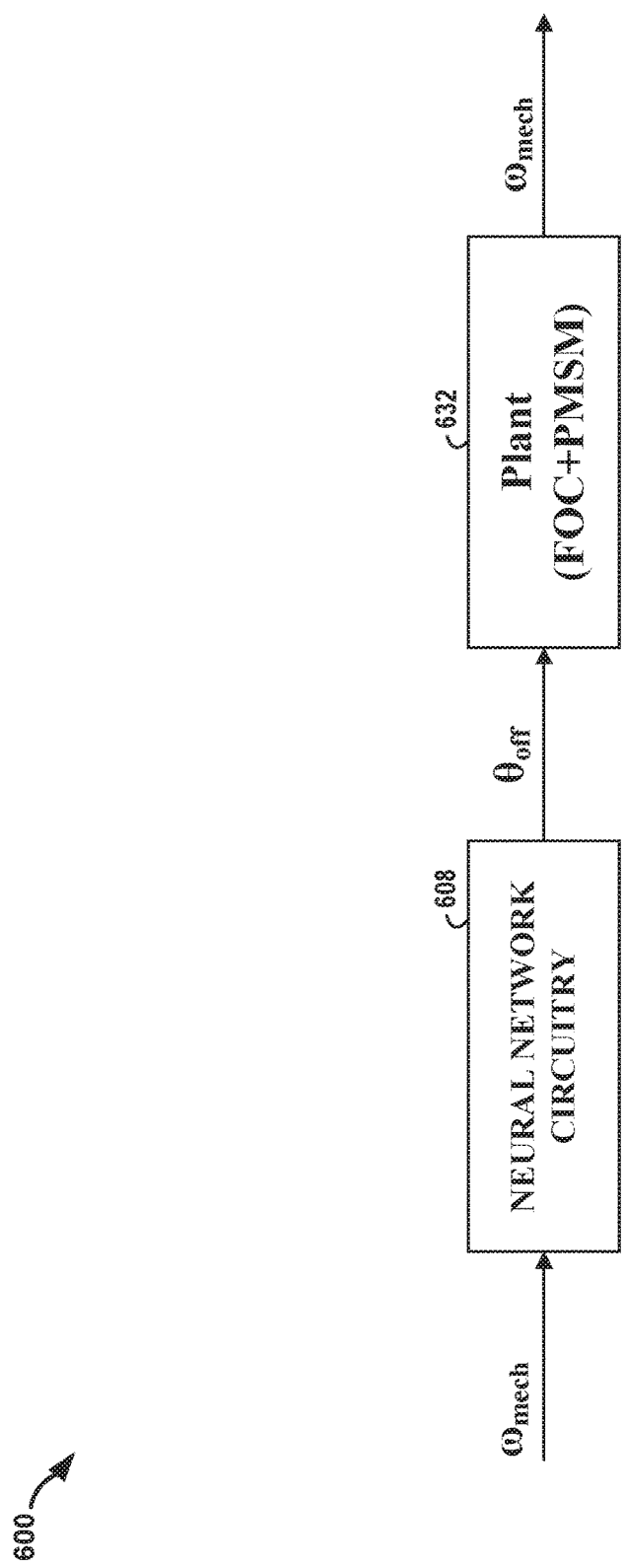
FIG. 6 is a block diagram illustrating an example system configured for using neural network circuitry to generate a rotor angle offset based on an instant rotor speed at a motor, in accordance with one or more techniques of this disclosure.

FIG. 6 is a block diagram illustrating an example system 600 configured for using neural network circuitry 608 to generate a rotor angle offset ("$\Theta_{off}$") based on an instant rotor speed ("$\omega_{mech}$") at a motor, in accordance with one or more techniques of this disclosure. FIG. 6 shows the feed forward implementation. After the training of neural network circuitry 608 has been finished, the instant rotor speed may be used an input for neural network circuitry 608. In this example, plant 632 may use the rotor angle offset for control circuitry (e.g., control circuitry 120) and for the transformations (e.g., by transform circuitry 124 and/or inverse transform circuitry 122). Once training has been completed, no further training of neural network circuitry 608 is necessary if the transfer characteristic does not change. In some examples, however, neural network circuitry 608 may be trained to account for changes in the transfer characteristic. For instance, neural network circuitry 608 may be trained to account for changes in acceleration, temperature, age of plant 632, or other factors.

Figure 7:
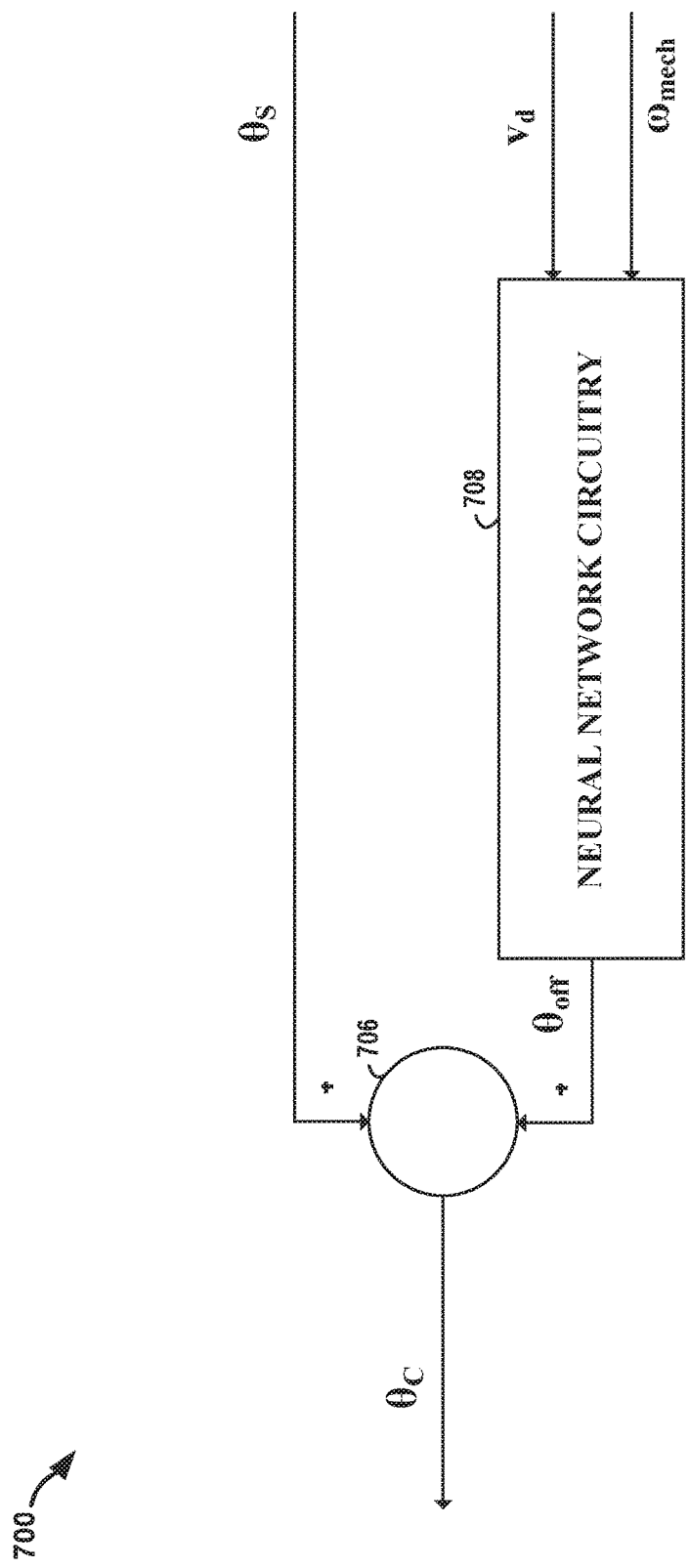
FIG. 7 is a block diagram illustrating an example system configured for training neural network circuitry and using the neural network circuitry to generate a rotor angle offset, in accordance with one or more techniques of this disclosure.

FIG. 7 is a block diagram illustrating an example system 700 configured for training neural network circuitry 708 and using neural network circuitry 708 to generate a rotor angle offset, in accordance with one or more techniques of this disclosure. Although FIG. 7 is discussed with reference to system 100 of FIG. 1 and system 200 of FIG. 2, techniques of FIG. 7 may be used with other systems. Neural network circuitry 708 may be an example of neural network circuitry 108 of FIG. 1 and neural network circuitry 208 of FIG. 2. Summer 706 may be an example of logic circuitry 106 of FIG. 1 or an example component of logic circuitry 106 of FIG. 1. As shown, summer 706 may be separated from neural network circuitry 708. In some examples, summer 706 may be included in neural network circuitry 708. Summer 706 may be configured to add the rotor angle offset ("$\theta_{off}$") to the sensed rotor angle value ("$\theta_S$") to generate the error compensated rotor angle ("$\theta_C$"). In some examples, summer 706 may be configured to add the rotor angle offset to an estimated rotor angle value to generate the error compensated rotor angle.

In the example of FIG. 7, neural network circuitry 708 may be configured to receive a d-axis instant voltage value ("$V_d$"). In some examples, neural network circuitry 708 may be configured to train or retrain using the d-axis instant voltage value. For instance, neural network circuitry 708 may be configured to train using the process of FIG. 5. In some examples, neural network circuitry 708 may be configured to train using the process of FIGS. 3 and 4.

Figure 8:
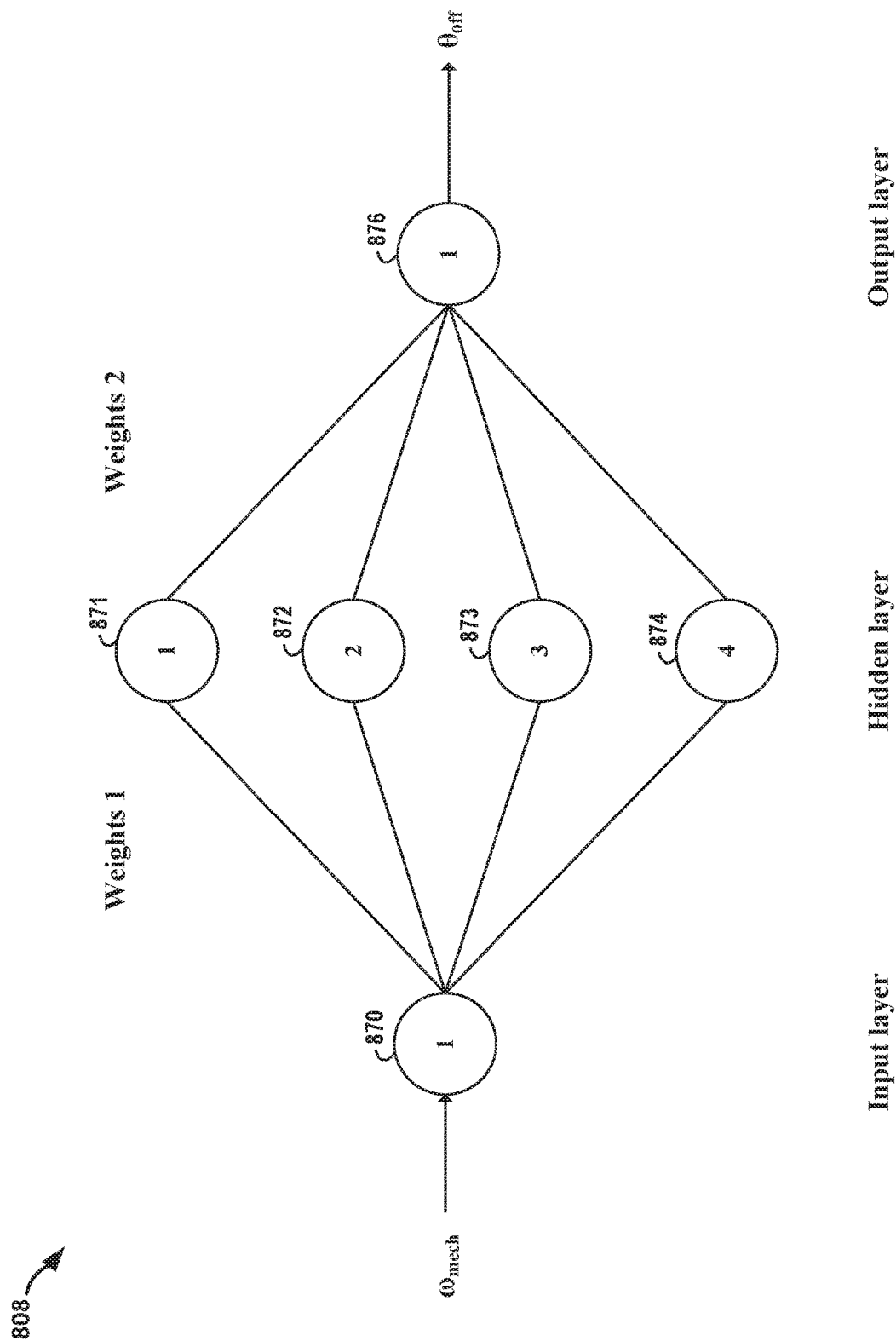
FIG. 8 is a block diagram illustrating example neural network circuitry trained to generate a rotor angle offset, in accordance with one or more techniques of this disclosure.

FIG. 8 is a block diagram illustrating example neural network circuitry 808 trained to generate a rotor angle offset, in accordance with one or more techniques of this disclosure. The techniques described herein may be implemented in various neural network configurations. The neural network circuitry 808 may be configured to run with a high frequency on an embedded system and may be executed in the real-time. For example, neural network circuitry 808 may be configured to pulse-width modulation of 100 kHz and use a control algorithm that calculates a rotor angle offset every 10 us.

In the example of FIG. 8, neural network circuitry 808 includes a multi-layer-perceptron (MLP) with a supervised learning strategy. Neural network circuitry 808 may, for example, include a number of neurons in the range of about 4-20 depending on a desired accuracy. FIG. 8 shows a network structure that includes input 870 at an input layer, which receives an instant rotor speed ("$\omega_{mech}$") at a motor, neurons 871-874 at a hidden layer, and output 876 at an output layer, which outputs the rotor angle offset ("$\theta_{off}$"). In some examples, neural network circuitry may use more than one input. Neural network circuitry may use more than one output. In some examples, neural network circuitry may use less than 4 neurons (e.g., 1, 2, or 3 neurons) or more than 4 neurons (e.g., more than 10, more than 20, etc.). For example, neural network circuitry 808 may include 10 neurons in the hidden layer with an ellipsoid activation function.

Figure 9:
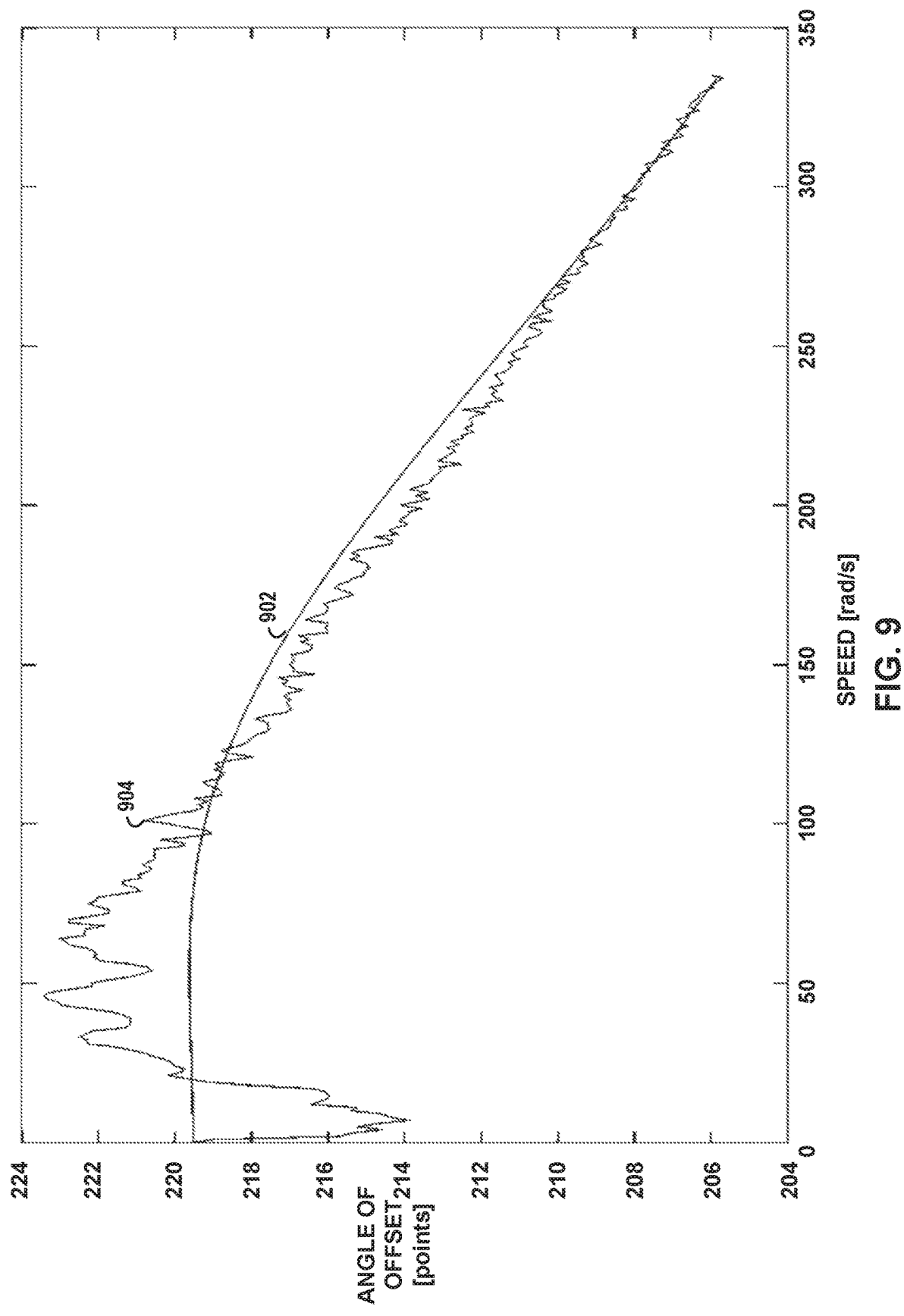
FIG. 9 is an illustration of true rotor angle offsets and rotor angle offsets output by neural network circuitry, in accordance with one or more techniques of this disclosure.

FIG. 9 is an illustration of true rotor angle offsets and rotor angle offsets output by neural network circuitry, in accordance with one or more techniques of this disclosure. Although FIG. 9 is discussed with reference to system 100 of FIG. 1 and system 200 of FIG. 2, techniques of FIG. 9 may be used with other systems. The abscissa axis of FIG. 9 is instant rotor speed at motor 104 in radians per second (rad/s) and the ordinate axis of FIG. 9 is true rotor angle offset 902 and rotor angle offset 904 generated by neural network circuitry 108. In the example of FIG. 9, rotor angle offset 904 may be generated using the techniques of FIG. 5. However, rotor angle offset 904 may be generated using other techniques described herein, for instance, the techniques of examples shown in FIGS. 3 and 4.

Figure 10:
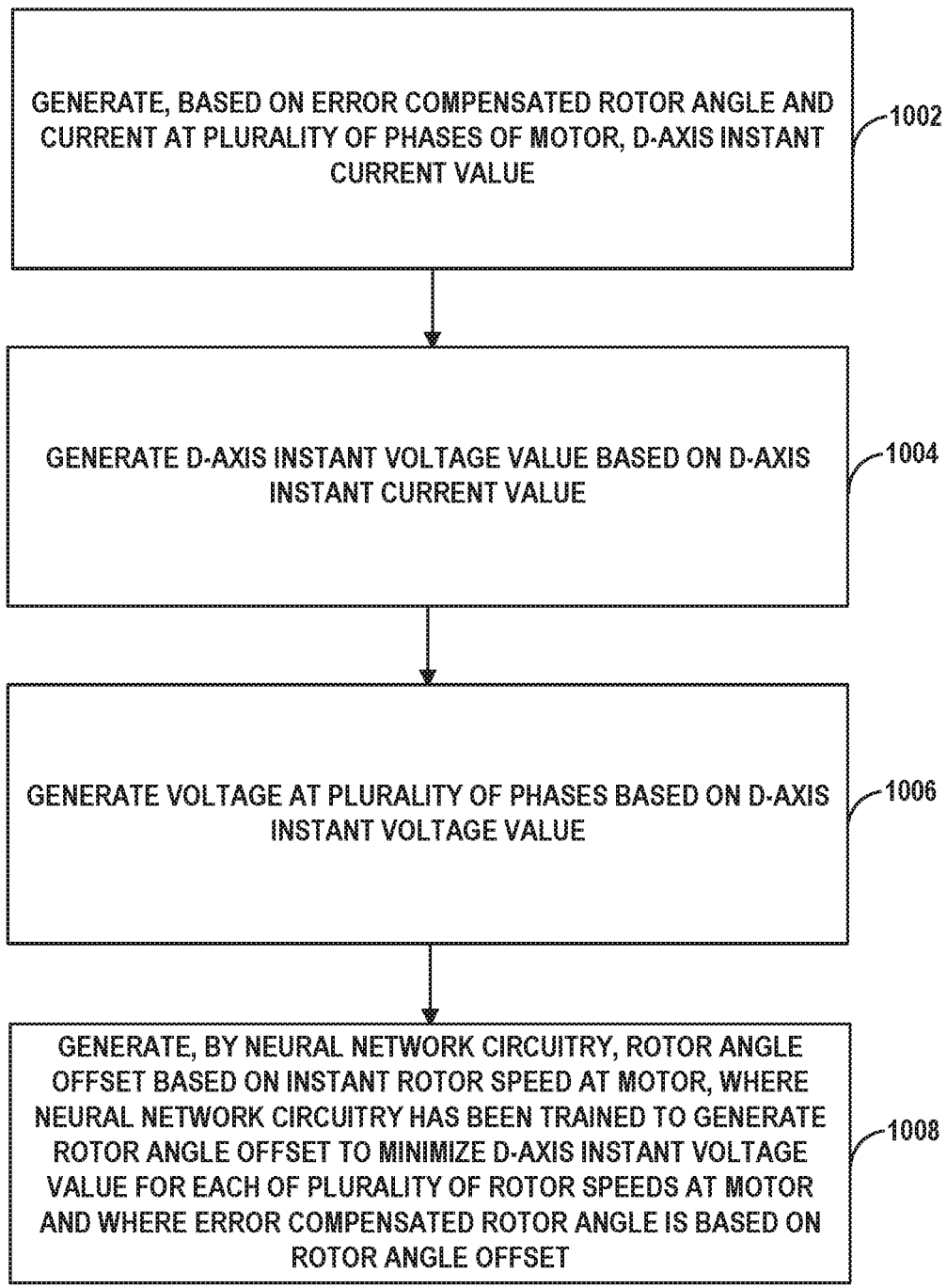
FIG. 10 is a flow diagram for driving a motor using a rotor angle offset, in accordance with one or more techniques of this disclosure.

FIG. 10 is a flow diagram for driving a motor using a rotor angle offset, in accordance with one or more techniques of this disclosure. For purposes of illustration only, the example operations are described below within the context of FIGS. 1-9.

In accordance with the techniques of the disclosure, motor circuitry 102 may be configured to generate, based on an error compensated rotor angle and current at a plurality of phases of motor 104, a d-axis instant current value (1002). Motor circuitry 102 may be configured to generate a d-axis instant voltage value based on the d-axis instant current value (1004). Motor circuitry 102 may be configured to generate voltage at the plurality of phases based on the d-axis instant voltage value (1008). Neural network circuitry 108 may be configured to generate a rotor angle offset based on an instant rotor speed at motor 104 (1008). In some examples, neural network circuitry 108 has been trained to generate the rotor angle offset to minimize the d-axis instant voltage value for each of a plurality of rotor speeds at motor 104. In some examples, the error compensated rotor angle is based on the rotor angle offset. For example, logic circuitry 106 may be configured to add the rotor angle offset to a sensed rotor angle value to generate the error compensated rotor angle. In some examples, logic circuitry 106 may be configured to add the rotor angle offset to an estimated rotor angle value to generate the error compensated rotor angle.

The following examples may illustrate one or more aspects of the disclosure.

Example 1. An apparatus for driving a motor, the apparatus comprising: motor circuitry configured to: generate, based on an error compensated rotor angle and current at a plurality of phases of the motor, a d-axis instant current value; generate a d-axis instant voltage value based on the d-axis instant current value; and generate voltage at the plurality of phases based on the d-axis instant voltage value; and neural network circuitry configured to generate a rotor angle offset based on an instant rotor speed at the motor, wherein the neural network circuitry has been trained to generate the rotor angle offset to minimize the d-axis instant voltage value for each of a plurality of rotor speeds at the motor and wherein the error compensated rotor angle is based on the rotor angle offset.

Example 2. The apparatus of example 1, wherein, to generate the d-axis instant voltage value, the motor circuitry is configured to: generate a d-axis current error value based on a difference between the d-axis instant current value and a d-axis reference value, wherein the d-axis reference value corresponds to zero; and apply a proportional-integral controller configured to generate the d-axis instant voltage value to minimize the d-axis instant current value error value.

Example 3. The apparatus of any combination of examples 1-2, wherein the d-axis instant current value is represented in a first rotating reference frame and wherein the motor circuitry is configured to: generate, based on the error compensated rotor angle and the current at the plurality of phases, a q-axis instant current value represented in a second rotating reference frame perpendicular to the first rotating reference frame; and generate a q-axis instant voltage based on the q-axis instant current value, wherein generating the voltage at the plurality of phases is further based on the q-axis instant voltage value.

Example 4. The apparatus of any combination of examples 1-3, wherein, to generate the d-axis instant current value and to generate the q-axis instant current value, the motor circuitry is configured to apply a Clarke transform on the current at the plurality of phases to generate an alpha current value and a beta current value and apply, based on the error compensated rotor angle, a Park transform on the alpha current value and the beta current value to generate the d-axis instant current value and the q-axis instant current value; and wherein, to generate the voltage at the plurality of phases, the motor circuitry is configured to apply, based on the error compensated rotor angle, an inverse Park transform on the d-axis instant voltage value and the q-axis instant voltage to generate an alpha voltage value and a beta voltage value and apply an inverse Clarke transform on the alpha voltage value and the beta voltage value to generate the voltage at the plurality of phases.

Example 5. The apparatus of any combination of examples 1-4, comprising: rotor position sensor circuitry configured to detect a sensed rotor angle value of a rotor of the motor; logic circuitry configured to add the rotor angle offset to the sensed rotor angle value to generate the error compensated rotor angle; and speed calculation circuitry configured to determine the instant rotor speed using the sensed rotor angle value.

Example 6. The apparatus of any combination of examples 1-5, comprising: rotor position estimation circuitry configured to generate an estimated rotor angle value of the rotor; logic circuitry configured to add the rotor angle offset to the estimated rotor angle value to generate the error compensated rotor angle; and speed calculation circuitry configured to determine the instant rotor speed using the estimated rotor angle.

Example 7. The apparatus of any combination of examples 1-6, wherein the neural network circuitry has been further trained to generate the rotor angle offset to minimize the d-axis instant voltage value for a plurality of temperature values.

Example 8. The apparatus of any combination of examples 1-7, wherein the neural network circuitry is configured to train a plurality of neurons of the neural network circuitry to generate the rotor angle offset to minimize the d-axis instant voltage value, wherein, to train the plurality of neurons of the neural network, the neural network circuitry is configured to: generate a rotor speed table, each entry in the rotor speed table comprising a respective rotor speed value of the plurality of rotor speeds and a corresponding true rotor angle offset; and train the plurality of neurons of the neural network circuitry using the rotor speed table.

Example 9. The apparatus of any combination of examples 1-8, wherein, to train the plurality of neurons of the neural network circuitry using the rotor speed table, the neural network circuitry is configured to: train, for each respective rotor speed value of the plurality of rotor speeds, the plurality of neurons of the neural network circuitry to minimize a difference between the rotor angle offset output by the neural network circuitry and the corresponding true rotor angle offset.

Example 10. The apparatus of any combination of examples 1-9, wherein the neural network circuitry is configured to train a plurality of neurons of the neural network circuitry to generate the rotor angle offset to minimize the d-axis instant voltage value, wherein, to train the plurality of neurons of the neural network, the neural network circuitry is configured to: generate a temperature table, each entry in the temperature table comprising a respective temperature value of a plurality of temperature values and a corresponding true rotor angle offset; and train the plurality of neurons of the neural network circuitry using the temperature table.

Example 11. The apparatus of any combination of examples 1-10, wherein the neural network circuitry is configured to: train, for each rotor speed of the plurality of rotor speeds, a plurality of neurons of the neural network circuitry to output the rotor angle offset that minimizes the d-axis instant voltage value.

Example 12. The apparatus of any combination of examples 1-11, wherein the d-axis instant current value is represented in a rotating reference frame fixed to a rotor of the motor.

Example 13. The apparatus of any combination of examples 1-12, wherein the motor comprises a permanent-magnet-synchronous-motor (PMSM) or a DC-excited motor.

Example 14. A method for driving a motor, the method comprising: generating, by processing circuitry and based on an error compensated rotor angle and current at a plurality of phases of the motor, a d-axis instant current value; generating, by the processing circuitry, a d-axis instant voltage value based on the d-axis instant current value; generating, by the processing circuitry, voltage at the plurality of phases based on the d-axis instant voltage value; and generating, by neural network circuitry of the processing circuitry, a rotor angle offset based on an instant rotor speed at the motor, wherein the neural network circuitry has been trained to generate the rotor angle offset to minimize the d-axis instant voltage value for each of a plurality of rotor speeds at the motor and wherein the error compensated rotor angle is based on the rotor angle offset.

Example 15. The method of example 14, wherein generating the d-axis voltage value comprises: generating a d-axis current error value based on a difference between the d-axis instant current value and a d-axis reference value, wherein the d-axis reference value corresponds to zero; and applying a proportional-integral controller configured to generate the d-axis instant voltage value to minimize the d-axis instant current value error value.

Example 16. An apparatus for driving a motor, the apparatus comprising: motor circuitry configured to: generate, based on an error compensated rotor angle and current at a plurality of phases of the motor, a d-axis instant current value; generate a d-axis instant voltage value based on the d-axis instant current value; and generate voltage at the plurality of phases based on the d-axis instant voltage value; and neural network circuitry configured to: apply training to a plurality of neurons of the neural network circuitry to configure the plurality of neurons to generate a respective rotor angle offset for each of a plurality of rotor speeds that minimize the d-axis instant voltage value; and after applying the training, generate a rotor angle offset based on an instant rotor speed at the motor, wherein the error compensated rotor angle is based on the rotor angle offset.

Example 17. The apparatus of examples 16, wherein, to apply the training, the neural network circuitry is configured to train the plurality of neurons to configure the plurality of neurons to generate the rotor angle offset to minimize the d-axis instant voltage value for a plurality of temperature values.

Example 18. The apparatus of any combination of examples 16-17, wherein, to apply training, the neural network circuitry is configured to: generate a rotor speed table, each entry in the rotor speed table comprising a respective rotor speed value of the plurality of rotor speeds and a corresponding true rotor angle offset; and train the plurality of neurons of the neural network circuitry using the rotor speed table.

Example 19. The apparatus of any combination of examples 16-18, wherein, to train the plurality of neurons of the neural network circuitry using the rotor speed table, the neural network circuitry is configured to: train, for each respective rotor speed value of the plurality of rotor speeds, the plurality of neurons of the neural network circuitry to minimize a difference between the respective rotor angle offset output by the neural network circuitry and the corresponding true rotor angle offset.

Example 20. The apparatus of any combination of examples 16-19, wherein, to apply the training, the neural network circuitry is configured to: train, for each rotor speed of the plurality of rotor speeds, the plurality of neurons of the neural network circuitry to output the respective rotor angle offset that minimizes the d-axis instant voltage value.

Various aspects have been described in this disclosure. These and other aspects are within the scope of the following claims.

The invention claimed is:

1. An apparatus for driving a motor, the apparatus comprising:
   motor circuitry configured to:
      generate, based on an error compensated rotor angle and current at a plurality of phases of the motor, a d-axis instant current value;
      generate a d-axis instant voltage value based on the d-axis instant current value; and
      generate voltage at the plurality of phases based on the d-axis instant voltage value; and
   neural network circuitry configured to generate a rotor angle offset based on an instant rotor speed at the motor, wherein the neural network circuitry is configured to train a plurality of neurons of the neural network circuitry to generate the rotor angle offset to minimize the d-axis instant voltage value for each of a plurality of rotor speeds at the motor and wherein the error compensated rotor angle is based on the rotor angle offset.

2. The apparatus of claim 1, wherein, to generate the d-axis instant voltage value, the motor circuitry is configured to:
   generate a d-axis current error value based on a difference between the d-axis instant current value and a d-axis reference value, wherein the d-axis reference value corresponds to zero; and apply a proportional-integral controller configured to generate the d-axis instant voltage value to minimize the d-axis instant current value error value.

3. The apparatus of claim 1, wherein the d-axis instant current value is represented in a first rotating reference frame and wherein the motor circuitry is configured to:
generate, based on the error compensated rotor angle and the current at the plurality of phases, a q-axis instant current value represented in a second rotating reference frame perpendicular to the first rotating reference frame; and
generate a q-axis instant voltage based on the q-axis instant current value, wherein generating the voltage at the plurality of phases is further based on the q-axis instant voltage value.

4. The apparatus of claim 3,
wherein, to generate the d-axis instant current value and to generate the q-axis instant current value, the motor circuitry is configured to apply a Clarke transform on the current at the plurality of phases to generate an alpha current value and a beta current value and apply, based on the error compensated rotor angle, a Park transform on the alpha current value and the beta current value to generate the d-axis instant current value and the q-axis instant current value; and
wherein, to generate the voltage at the plurality of phases, the motor circuitry is configured to apply, based on the error compensated rotor angle, an inverse Park transform on the d-axis instant voltage value and the q-axis instant voltage to generate an alpha voltage value and a beta voltage value and apply an inverse Clarke transform on the alpha voltage value and the beta voltage value to generate the voltage at the plurality of phases.

5. The apparatus of claim 1, comprising:
rotor position sensor circuitry configured to detect a sensed rotor angle value of a rotor of the motor;
logic circuitry configured to add the rotor angle offset to the sensed rotor angle value to generate the error compensated rotor angle; and
speed calculation circuitry configured to determine the instant rotor speed using the sensed rotor angle value.

6. The apparatus of claim 1, comprising:
rotor position estimation circuitry configured to generate an estimated rotor angle value of the rotor;
logic circuitry configured to add the rotor angle offset to the estimated rotor angle value to generate the error compensated rotor angle; and
speed calculation circuitry configured to determine the instant rotor speed using the estimated rotor angle.

7. The apparatus of claim 1, wherein the neural network circuitry has been further trained to generate the rotor angle offset to minimize the d-axis instant voltage value for a plurality of temperature values.

8. The apparatus of claim 1, wherein, to train the plurality of neurons of the neural network, the neural network circuitry is configured to:
generate a rotor speed table, each entry in the rotor speed table comprising a respective rotor speed value of the plurality of rotor speeds and a corresponding true rotor angle offset; and
train the plurality of neurons of the neural network circuitry using the rotor speed table.

9. The apparatus of claim 8, wherein, to train the plurality of neurons of the neural network circuitry using the rotor speed table, the neural network circuitry is configured to:
train, for each respective rotor speed value of the plurality of rotor speeds, the plurality of neurons of the neural network circuitry to minimize a difference between the rotor angle offset output by the neural network circuitry and the corresponding true rotor angle offset.

10. The apparatus of claim 1, wherein, to train the plurality of neurons of the neural network, the neural network circuitry is configured to:
generate a temperature table, each entry in the temperature table comprising a respective temperature value of a plurality of temperature values and a corresponding true rotor angle offset; and
train the plurality of neurons of the neural network circuitry using the temperature table.

11. The apparatus of claim 1, wherein the d-axis instant current value is represented in a rotating reference frame fixed to a rotor of the motor.

12. The apparatus of claim 1, wherein the motor comprises a permanent-magnet-synchronous-motor (PMSM) or a DC-excited motor.

13. A method for driving a motor, the method comprising:
generating, by processing circuitry and based on an error compensated rotor angle and current at a plurality of phases of the motor, a d-axis instant current value;
generating, by the processing circuitry, a d-axis instant voltage value based on the d-axis instant current value;
generating, by the processing circuitry, voltage at the plurality of phases based on the d-axis instant voltage value; and
generating, by neural network circuitry of the processing circuitry, a rotor angle offset based on an instant rotor speed at the motor, wherein the neural network circuitry is configured to train a plurality of neurons of the neural network circuitry to generate the rotor angle offset to minimize the d-axis instant voltage value for each of a plurality of rotor speeds at the motor and wherein the error compensated rotor angle is based on the rotor angle offset.

14. The method of claim 13, wherein generating the d-axis voltage value comprises:
generating a d-axis current error value based on a difference between the d-axis instant current value and a d-axis reference value, wherein the d-axis reference value corresponds to zero; and
applying a proportional-integral controller configured to generate the d-axis instant voltage value to minimize the d-axis instant current value error value.

15. An apparatus for driving a motor, the apparatus comprising:
motor circuitry configured to:
generate, based on an error compensated rotor angle and current at a plurality of phases of the motor, a d-axis instant current value;
generate a d-axis instant voltage value based on the d-axis instant current value; and
generate voltage at the plurality of phases based on the d-axis instant voltage value; and
neural network circuitry configured to:
apply training to a plurality of neurons of the neural network circuitry to configure the plurality of neurons to generate a respective rotor angle offset for each of a plurality of rotor speeds that minimize the d-axis instant voltage value; and
after applying the training, generate a rotor angle offset based on an instant rotor speed at the motor, wherein the error compensated rotor angle is based on the rotor angle offset.

16. The apparatus of claim 15, wherein, to apply the training, the neural network circuitry is configured to train the plurality of neurons to configure the plurality of neurons to generate the rotor angle offset to minimize the d-axis instant voltage value for a plurality of temperature values.

17. The apparatus of claim 15, wherein, to apply training, the neural network circuitry is configured to:
   generate a rotor speed table, each entry in the rotor speed table comprising a respective rotor speed value of the plurality of rotor speeds and a corresponding true rotor angle offset; and
   train the plurality of neurons of the neural network circuitry using the rotor speed table.

18. The apparatus of claim 17, wherein, to train the plurality of neurons of the neural network circuitry using the rotor speed table, the neural network circuitry is configured to:
   train, for each respective rotor speed value of the plurality of rotor speeds, the plurality of neurons of the neural network circuitry to minimize a difference between the respective rotor angle offset output by the neural network circuitry and the corresponding true rotor angle offset.

19. The apparatus of claim 15, wherein, to apply the training, the neural network circuitry is configured to:
   train, for each rotor speed of the plurality of rotor speeds, the plurality of neurons of the neural network circuitry to output the respective rotor angle offset that minimizes the d-axis instant voltage value.

\* \* \* \* \*